May 3, 1966  D. C. BRODERICK  3,249,899
GASEOUS-SOLID STATE POWER LIMITER
Filed Aug. 3, 1962  3 Sheets-Sheet 1

INVENTOR.
David C. Broderick
BY
Robert L. Slater, Jr.
Atty.

May 3, 1966  D. C. BRODERICK  3,249,899
GASEOUS-SOLID STATE POWER LIMITER
Filed Aug. 3, 1962  3 Sheets-Sheet 2

INVENTOR.
David C. Broderick
BY
Robert L. Slater, Jr.
Atty.

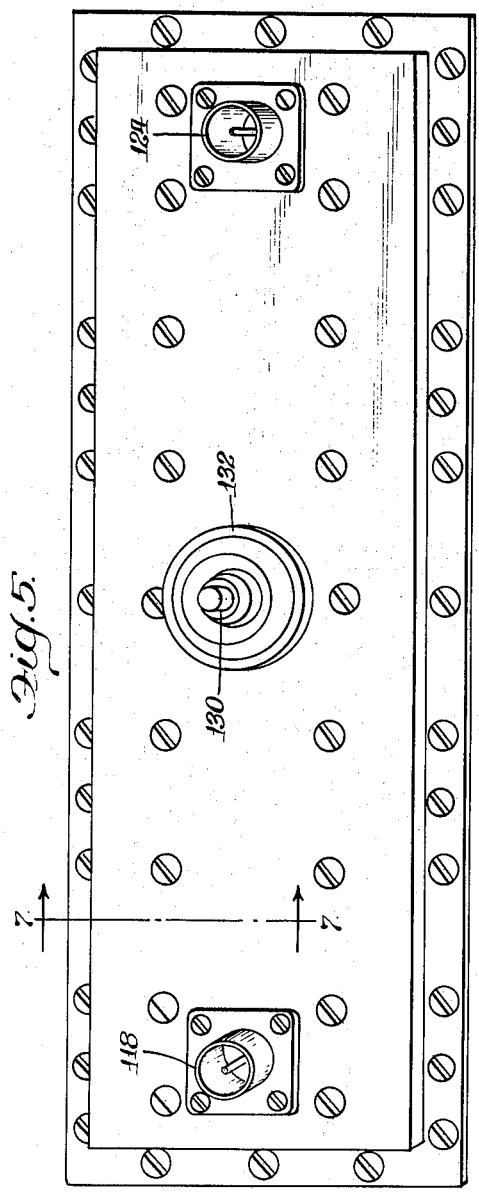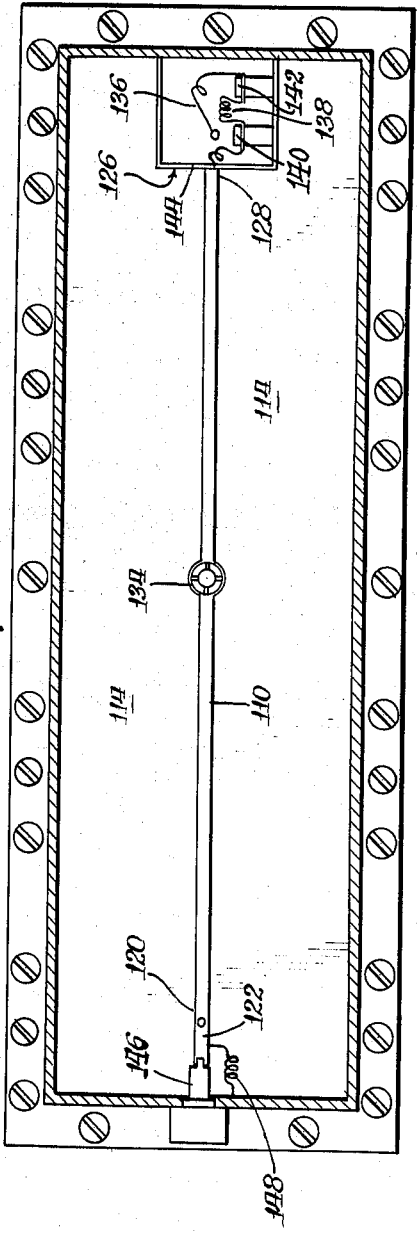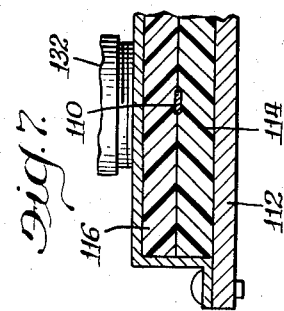

United States Patent Office 3,249,899
Patented May 3, 1966

3,249,899
GASEOUS-SOLID STATE POWER LIMITER
David C. Broderick, Beverly, Mass., assignor to Metcom, Inc., Salem, Mass., a corporation of Delaware
Filed Aug. 3, 1962, Ser. No. 214,546
6 Claims. (Cl. 333—13)

The present invention relates to devices for limiting passage of peak loads of electromagnetic energy; more particularly it relates to devices for limiting the propagation of destructively high power radio frequency signals in the frequency range from 100 megacycles upward.

Radar, microwave systems and other higher frequency systems require that sensitive system components, receivers, and crystal detectors be protected from direct incidence of high powered radio frequency energy pulses. For instance, in radar equipment exposure of sensitive parts of the system to destructively high powered microwave pulse signals arises when the high powered pulse generator, most frequently a magnetron, fires, or when directly beamed signals from a second microwave system fall on the antenna and are transmitted back to the receiver or other sensitive elements of the system. When protection from excessively high power pulse signals is being designed, for example for use in a radar system, it is known what frequency signals will be emitted by the magetron or signal generator incorporated within the system. However, it is not predictable what frequency range of signals arising from other radar sets may be beamed directly onto the antenna of the system. It is, therefore, important that the sensitive elements of a radar system be protected against stray high powered radiation throughout a wide range of frequency bands. Gaseous electron discharge tubes which have a resonant discharge gap mounted within a cavity have long been utilized as TR or transmit-receive tubes and ATR or anti-transmit-receive tubes in radar systems. In typical installations, the TR tube is mounted so that upon incidence of a high power pulse signal, the tube fires; that is, the gas within the tube cavity ionizes and electrons are discharged. As a result of the electron discharge a highly conductive electron stream or arc shorts the wave guide, which in the conventional installation designs isolates the receiver from the incident high powered signal.

One disadvantage of the conventional TR tube mounted within a wave guide is the restricted frequency range of signals which will dependably fire the tube. RF signals of sufficient power to damage the sensitive receiver componets will often be passed by the conventional gaseous electron discharge tube when those signals have shorter wave lengths than the pass band wave length of the gap within the tube cavity.

Another disadvantage of the conventional gaseous TR tube is the fact that in the brief interval of time between the incidence of the signal and the actual shorting of the TR tube by the electron discharge, a substantial power "spike" passes the tube and travels into the receiver. This initial power spike passes the gap even though a powered "keep alive" electrode is mounted in the resonant gap of the electron discharge tube.

A continuing trend of utilizing more powerful signal generators and even more sensitive receivers has heightened the need for improved, more reliable, broader frequency band protection of receivers and particularly receiver crystals in radar systems.

The ideal microwave receiver protective device affords substantial attenuation of high powered signals throughout a wide range of frequencies, a low insertion loss for low powered signals, rapid recovery time to accommodate high pulse repetition rate, and dependable long life operation. Some solid state semiconductor devices exhibit in a general way the highly nonlinear power attenuation characteristics that are required to pass low power signals with minimal insertion loss and attenuate high power signals with high efficiency. However, none of the existent solid state components are suitable for direct substitution for the gaseous electron discharge tube. The reason for this unsuitability in existing solid state devices for direct substitution for gaseous electron discharge tubes arises from the fact that these semi-conductor devices are limited by their maximum power density; that is, most solid state or semiconductor devices are extremely small and dissipate only a limited amount of energy by radiation or convecting cooling. Another limitation of existing semiconductor devices which renders them unsuitable for direct substitution for gaseous electron discharge TR tubes is that they exhibit relatively large reactances which cause reflection of incident power. High frequency performance in solid state devices, that is, in the megacycle and kilomegacycle region, requires that the distances between the electrodes and boundaries of the component parts of the device be sufficiently short so that junction reactance, spreading resistance and transit times of electrons or holes through the semiconductor will be consistent with high frequency requirements of the device. In general, then, the smaller the solid state or semiconductor structures, the higher the frequency response before cut-off exhibited by the device but the less capacity in general the semiconductor device will exhibit to dissipate heat in higher power applications and, in a general sense, the less easily will the device be matched in impedance to the input and output structures with which it is mounted in a given system.

There exists, then, need for improved power limiting devices which effectively function across a wide frequency range and afford low insertion loss for low power signals and high attenuation for high power signals. Presently used gaseous electron discharge tubes have typical insertion losses of .5 db of low power signals, that is signal strengths of 1–2 watts peak power, and 10 db attenuation of high power signals, that is signal strengths above 10 watts peak power, through a frequency band pass range of ten percent.

One object of my invention is to provide a novel power limiter for radio frequency signals ranging from UHF frequencies upward.

Another object of my invention is to provide a radio frequency band power limiter with an improved broadened frequency band response.

Another object of my invention is to provide a highly efficient radio frequency power limiter which reduces and substantially eliminates the initial power "spike" which passes conventional gaseous electron discharge tubes.

Another object of my invention is to provide a broad radio frequency band power limiter utilizing lightweight, compact, solid state semiconductor structures.

Still another object of my invention is to provide a novel, compact, rugged, general purpose radio frequency power limiter.

These and other objects and advantages of my invention will be apparent from the following drawings, specification and claims.

FIGURE 5 is a top plane view of a second preferred embodiment of my invention.

FIGURE 6 is a cross-section view taken on a horizontal plane of the embodiment of my invention shown in FIGURE 5.

FIGURE 7 is a transverse cross-sectional view taken on plane 7—7 of the embodiment of my invention shown in FIGURE 5.

Figure 1:
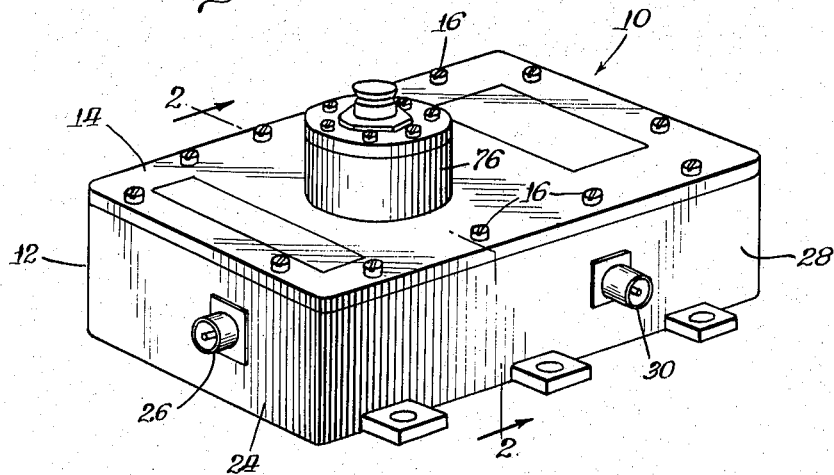
FIGURE 1 is a perspective view of the external features of a preferred embodiment of my invention.
Figure 2:
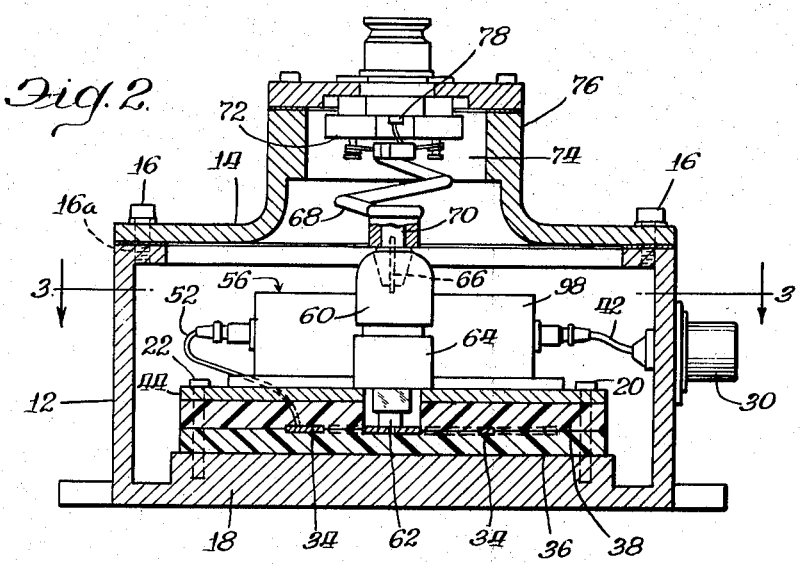
FIGURE 2 is a cross-section view taken on plane 2—2 of the embodiment of my invention shown in FIGURE 1.
Figure 3:
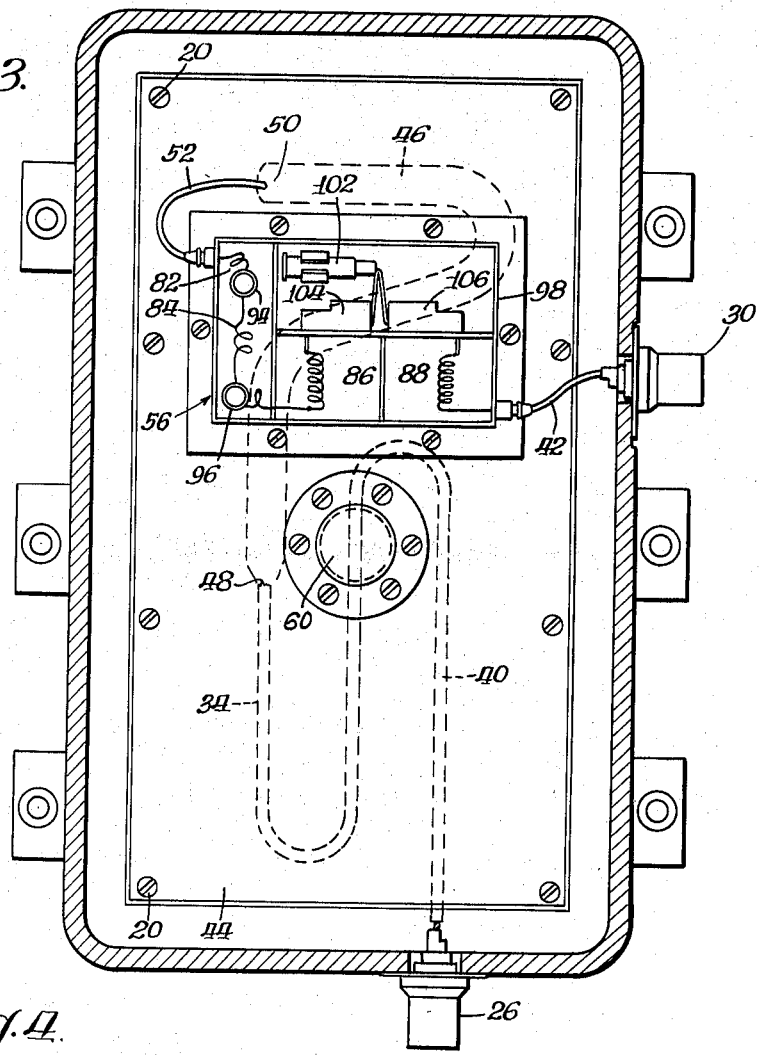
FIGURE 3 is a second cross-sectional view taken on plane 3—3 of the embodiment of my invention shown in FIGURE 1.
Figure 4:
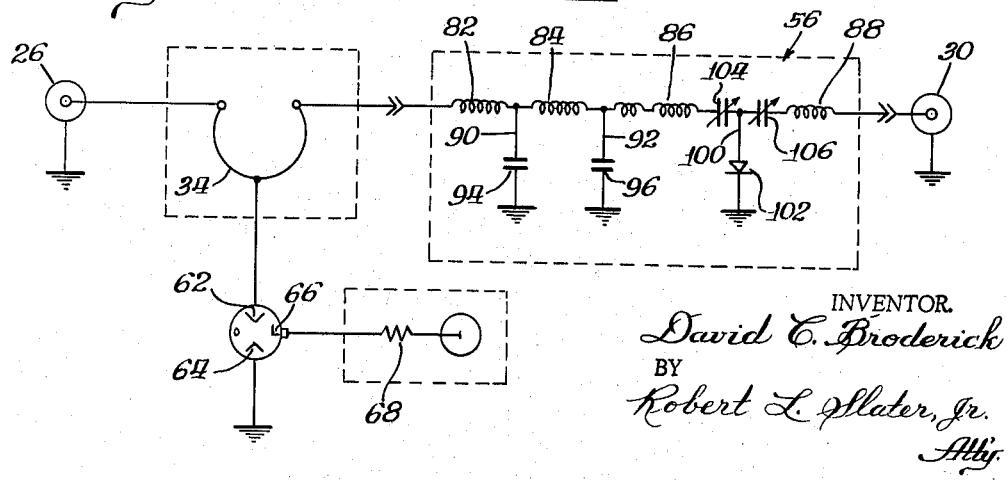
FIGURE 4 is a schematic circuit diagram of the electrical circuit of the embodiment of my invention shown in FIGURE 1.

Referring now to the drawings, FIGURE 1 illustrates the external features of a preferred embodiment of my invention, wherein a conductive metal case 10 comprised of an elongated four-sided housing 12 is made RF radiation tight by a bolted conductive metal top 14. The top 14 is held securely in place on the case 10 by means of a plurality of threaded bolts 16. In the particular embodiment shown in FIGURES 1 through 4, threaded holes 16a are provided in the side walls of the housing 12 to reecive the bolts 16. The interior of the metal housing 12 is provided with a conductive metal bottom plate 18, which is sufficiently thick to accommodate threaded fasteners or screws 20 and 22. A first end or side 24 of the metal case is provided with an input coaxial connector 26; a second end, or as shown in the particular embodiment, a side 28 of the metal case 10 is provided with an output coaxial connector 30.

Within the case 10, and mounted upon the bottom plate 18, is an elongated electrical conductor 34, positioned between layers of dielectric material 36 and 38. The elongated conductor 34 is electrically isolated from the conducting case 10 but connected electrically to the input coaxial connector 26 at a first end and, through electronic component means which are described below, connected to the output coaxial connection 30 by short shielded lead 42 at its second end. A conducting metal plate 44 is positioned above the uppermost dielectric layer 38 and is held in place and in turn holds the elongated conductor 34 and the dielectric layers in place by means of the threaded fasteners 20 and 22. The electrical conductor 34 is divided into two sections, the first high impedance section 40, and a following low impedance section 46; the two sections are joined at junction 48. The line section 40 is an ohmic resistance high impedance conductor; the impedance of the conductor may be readily varied in different embodiments of my invention by varying the width and thickness of the conductor which is conveniently made of high conductivity copper. The high impedance section 40 of the conductor 34 must be at least a compensated one-half wave length long section at the center frequency of the transmission band. The section 40 of the conductor may be bent into a series of open loops to save space; such a space saving configuration is readily seen by reference to FIGURE 3. The whole arrangement of the high impedance section 40 of the conductor 34, dielectric layers 36 and 38 and plates 18 and 44 comprises a stripline cavity.

The conductor section 46 terminates at its second or output end 50, at which point a short shielded lead 52 connects it to an electric filter assembly generally indicated at 56. The electrical wave filter 56, described elsewhere in more detail, is the electrical component means referred to above through which the conductor 34 is connected to the output coaxial connector 30.

A gaseous electron discharge tube 60 consisting essentially of two electrodes positioned to form a resonant gap within an envelope containing a gas such as $N_2$ at a low pressure of between .5 and 40 mm. of Hg is mounted within the case 10, so that one electrode 62 of the tube is in electrical contact with the high impedance section 40 of the conductor 34 at a point on the conductor a spaced distance from the junction 48 between the high impedance and low impedance sections of the conductor. The point of contact between the electrode 62 and the conductor section 40 is carefully selected to be a one-quarter compensated electrical wave length from the junction 48 on the conductor 34. Stated differently, the point of contact between the electrode 62 and the conductor 34 is at a voltage maximum of a standing wave on the conductor. The standing wave pattern is a result of wave reflections form variation in impedance in the line, such as occurs at the junction 48 in the strip line. The second electron discharge tube electrode 64 is connected to electrical ground through the plate 44. A coaxial "keep alive" electrode 66 included in the electron discharge tube 60 is powered through an insulated lead 68 which makes contact with the "keep alive" electrode through terminal 70. The case top 14 is provided with an insulated bracket 72 which provides a mounting for a conductor 78 through which power may be supplied to the "keep alive" electrode 66 without contact to the housing and top 14 which are at electrical ground potential. To accommodate the gaseous electron discharge tube 60 and the insulated bracket 72, a concave recess 74 is formed in the top cover 14 which is contained within a cylindrical boss 76 that projects above the top cover.

The filter 56 is a modified Pi L C circuit which may in addition to the passive elements include any of several nonlinear solid state semiconductor devices. Various arrangements of passive capacitive and inductive components will serve the purpose of the filter 56 in my invention. A preferred circuit arrangement and the one illustrated in the embodiment shown in FIGURES 1 through 4 comprises inductances 82, 84, 86 and 88 in series; two circuits 90 and 92 which branch at the terminals of inductances 82 and 84 and are connected to ground through capacitors 94 and 96; a third circuit 100 shunted to ground through a semiconductor device 102 and which branches from between two trimmer capacitors 104 and 106 that are connected in series between inductances 86 and 88.

The filter 56 components are mounted or bracketed within an RF radiation tight container 98 which in turn may be conveniently secured to the plate 44 for mounting and ground connection.

The semiconductor device 102 may be any of a variety of diodes which are nonlinear with respect to voltage; that is, the resistance in the forward path decreases rapidly with application of increasing voltage, making the device highly conductive at high voltage and capacitive at low voltage. Silicon diffused junction diodes of the mesa design, commonly called varactors, have operated satisfactorily in specific embodiments of my invention. A typical silicon didoe which I have utilized in these models is conductive in the forward path at .6 volt, has cutoff frequency above 100 kmc., and dissipates up to 300 milliwatts of power.

When an RF signal having a wave length in the pass band of the cavity is fed through the input connector 26, the signal is propagated by low loss normal transmission means along the high impedance section 40 of the conductor 34. A standing wave is formed as a reflection of energy waves from any impedance mismatch along the conductor 34; the first reflective impedance mismatch occurs at junction 48 where the high impedance section 40 and the low impedance section 46 of the conductor 34 join. A standing wave pattern is formed by the reflected waves and a point of maximum voltage difference between the conductor and the ground potential occurs at the crest of the standing voltage wave. The gaseous electron discharge tube 60 is mounted so that the electrode terminal 62 makes contact with the conductor section 40 at a point of high impedance on the conductor which is a maximum voltage point resulting from the standing wave pattern. In the embodiment of my invention illustrated in FIGURE 1, a voltage maximum occurs at one-quarter electrical wave length measured along the conductor section 40 back from the junction point 48.

Another source of reflected waves which results in a standing wave pattern on the conductor occurs in the filter assembly 56. The filter assembly 56 is comprised of two components, a low pass filter formed by the capacitors 94 and 96 and inductances 82, 84 and 86; and a band pass filter which includes the varactor 102, the capacitors 104 and 106, and the inductances 86 and 88. The low pass filter rejects signals having wave lengths shorter than that of the band pass frequencies which dependably will fire the electron tube 60. The band pass filter, within the limitations of the sharpness or "Q" of that filter, provides protection against passage of high powered pulses of energy in the frequencies both above and below the band pass frequency of the filter assembly 56. However, in order that there be a sufficiently low attenuation of low power signals, the "Q" of the filter 56 must be small enough to permit propagation of signals throughout a considerable frequency band. The shorter wave length, destructively high powered signals within the band pass frequency range will propagate through the filter into the sensitive receiver components but will not dependably fire the electron discharge tube 60.

The function of the semiconductor device 102 in the band pass filter is twofold. The semiconductor 102 at low power levels is nonconductive and highly capacitive. When the semiconductor device is in a capacitive, nonconductive condition, the frequency pass band of the filter is broad; attenuation of low power signals in the pass band frequencies is minimized. When the power level of the incident signals exceeds one milliwatt, which corresponds to 0.7 volt peak power in the embodiment of my invention described herein, the semiconductor device begins to conduct and detunes the band pass filter. Greater rejection of the short wave length, high powered signals is thus obtained by the detuned filter. Thus the semiconductor device at low incident signal power serves to increase capacitance of the filter and decrease attenuation; and at high incident signal power the varactor becomes conducting, exhibits less capacitance, and detunes the filter, resulting in rejection of the signals at the shorter wave length region of the pass band that are less likely to fire the gaseous electron discharge tube.

The voltage peaks in the standing waves on the conductor 34 are proportional to the power of the incident signal; hence, the tube 60 will fire and short to ground the elongated conductor 34 when the peak voltage in the standing wave exceeds the critical ionization voltage of the electron discharge tube. Typical voltages, for example, for firing gaseous electron discharge tubes are 10–20 volts in the UHV band.

The filter assembly 56 passive component L and C values are selected in accordance with well-known engineering principles. The filter is designed to pass signals in a frequency band that includes the longer transmission wave lengths of the entire strip line, filter, and connector assembly, and to minimize insertion losses for low power signals. The passive filter components reject the shorter wave length signals in those frequency bands above the transmission band frequencies efficiently, but cannot without increasing the insertion loss to intolerable values reduce the initial power "spike" signal in the transmission band which passes the gas tube prior to the tube firing. Similarly, the passive filter cannot attenuate the strong signals in the transmission frequency band which pass through the strip line when for some reason the gas tube fails to fire. In these latter two circumstances the semiconductor device 102 shunts signals to ground that have a voltage greater than the high resistance voltage of the semiconductor device. Typical voltage values for the forward path high conductance operation of the semiconductor diode 102 are .75–2 volts. Hence, with the combination of the gaseous electron discharge tube, the passive filter, and the semiconductor all mounted in spaced relationships with respect to the electrical distances along a common conductor, a very reliable low power signal low insertion loss, high power signal high attenuation system is provided.

A second preferred embodiment of my invention is illustrated in FIGURES 5, 6 and 7. An elongated conductor 110 is mounted in electrical isolation from, but within, an RF tight case 112 between two layers of high dielectric material 114 and 116. An output coaxial connector 118 mounted externally of the case 112 connects to an output point 120 a spaced distance from the output end 122 of the elongated conductor 110; an input coaxial connector 118 mounted externally of the case 112 connects through electronic component means 136, described below, to the input end 122 of the elongated conductor 110.

A gaseous electron discharge tube 130 having two electrodes is mounted within the case 112 and connects to a point at a spaced distance from the input end 122 of the elongated conductor with a first electrode and connects to ground potential with the second electrode. The tube 130 is encased within a hollow cylindrical boss 132 mounted integral with the case 112. The electrodes of the gaseous electron discharge tube 130 are not shown in FIGURE 6; however, the tube 60 shown in the embodiment of FIGURES 1–4 may be directly substituted for the tube 130. The point 134 on the elongated conductor 110, where contact with the first electrode of the tube 130 is made, is in the vicinity of a voltage peak of a standing wave on the elongated conductor 110. Normally, a standing wave voltage maximum occurs one-quarter electrical wavelength on the conductor measured back from the input end 122 thereof. The standing wave pattern is the result of reflection of waves from an impedance mismatch at the junction of the elongated conductor 110 and the electronic means 136.

The electronic means 126 is comprised of a band pass filter which may be any of a variety of configurations of passive inductive and capacitive elements. Passive filters may be designed in accordance with well known engineering principles. The band pass filter 136 shown in FIGURE 6 is comprised of the combination of inductance 138 and capacitors 140 and 142 mounted within an RF tight container 144 along with a solid state semiconductor device 146 and passive inductance elements 148 mounted within the case 112 positioned between the output end 122 of the conductor 110 and electrical ground. The semiconductor device 146 may be selected from any of a variety of solid state diodes; the embodiment illustrated utilizes a Sylvania varactor which is a diffused junction diode of the mesa design.

At low incident power the semiconductor diode 146 is capacitive and tends to broaden the transmission characteristics of the pass band filter. This action assures minimum insertion loss at low incident power. At high incident power, that is, signals having *one milliwatt* power and above (UHF frequency range), the semiconductor device 146 is conductive; in the conductive condition the diode detunes the band pass filter which then rejects shorter wave length signals, and which also shunts power from the high power signals directly to ground. The positioning of the semiconductor diode 146 at the output end 122 of the elongated conductor and passive filter components at the input end of the conductor 110, provided all the components—strip line conductor 110, diode 146, and passive filter components—are carefully selected and mounted to comprise a tuned band pass filter, introduces no change in the operating characteristics different from that of the embodiment of my invention illustrated in FIGURES 1–4 and described above.

The above illustrations and specification of two specific embodiments of my invention are merely illustrative of the principles of my invention and are intended in no way to limit the scope thereof which is set forth and claimed in the following claims.

I claim:
1. A device for limiting the power of high frequency electrical signals comprising in combination a conductor having an electrical impedance mounted within a resonant cavity, the conductor having a first end and at a fixed electrical wave length distance therefrom a second end, electrical wave filter means connected to the second end of the conductor having electrical impedance different from the impedance of the conductor wherewith standing electrical waves are induced on the conductor, and a two terminal gaseous electron discharge tube mounted with a first terminal contacting the conductor a spaced quarter wave length electrical distance from the second end of the conductor, the second terminal of the tube contacting electrical ground, the filter means comprising passive components in combination with a two terminal semiconductor diode connected between the passive components and electrical ground.

2. A device for limiting the power of high frequency electrical signal pulses comprising the combination of a conductor mounted within a resonant cavity, the conductor having a first end and at a spaced electrical distance a second end, the conductor being mounted within the cavity so that electrical signals of only a limited transmission band frequency are propagated along the conductor, a passive filter circuit electrically connected to the second end of the conductor, a two terminal gaseous electron discharge tube mounted with a first terminal connected to the conductor at a quarter wave length spaced electrical distance from the second end of the conductor wherewith the first terminal contacts the conductor at a point of maximum standing wave voltage, the second tube terminal being connected to electrical ground, and a two terminal semiconductor device being connected between the passive filter circuit and electrical ground.

3. A device for limiting the power of high frequency RF signals comprising in combination an elongated conductor, a cavity, the conductor mounted within the cavity and electrically insulated therefrom, the conductor having a first end and at a spaced electrical distance a second end, the conductor being mounted within the cavity so that RF signals of only limited transmission band frequency are propagated along the conductor, a two terminal gaseous electron discharge tube mounted with a first terminal connected to the conductor at a spaced distance from the second end thereof, the second tube terminal being connected to electrical ground, a passive electron filter means connected to the second end of the conductor, the filter means having transmission band pass at the higher frequencies of the transmission band of said elongated conductor mounted within the cavity, and a variable reactance two terminal semiconductor device connected between the passive electric filter means and electrical ground.

4. A device for limiting the power of a high frequency electrical signal comprising an elongated conductor having a first end and a spaced electrical distance therefrom a second end, a dielectric mounting supporting the conductor, an electrical conducting sheath, the dielectric mounting supported within the sheath, in combination with a two terminal gaseous electron discharge tube mounted to make electrical contact at a first terminal with the conductor a spaced electrical distance from the second end of the conductor, the second terminal of the tube being connected to electrical ground, and a two terminal semiconductor diode mounted to electrically connect between the conductor a spaced distance from the second terminal and to electrical ground, whereby electrical signals propagated along the conductor are limited in voltage when the gaseous discharge tube fires, and are further limited in voltage when the semiconductor device conducts to ground.

5. A device for limiting the power of high frequency electrical signal pulses comprising the combination of a conductor mounted within a resonant cavity, the conductor having a first end and at a spaced electrical distance a second end, the conductor being mounted within the cavity so that electrical signals of only a limited band pass frequency are propagated along the conductor through standing waves, a two terminal gaseous electron discharge tube mounted with a first terminal connected to the conductor at a point of maximum standing wave voltage, the second tube terminal being connected to electrical ground, and a two terminal semiconductor device being connected between the conductor at a point of a second standing wave voltage peak and electrical ground.

6. A device for limiting transmission of destructively high-powered RF signals comprising a strip line cavity, a conductor electrically isolated from but mounted within the cavity, electrical wave band pass filter means, the conductor being connected to the filter means, a two terminal, nonlinear diode having variable capacitance inversely proportional to incident signal voltage, the diode being connected electrically between the conductor and electrical ground, and a two terminal gaseous electron discharge tube, a first terminal of the tube being in electrical contact with the conductor a spaced distance from the conductor connection to the filter means, and the second terminal of the tube being connected to electrical ground, whereby the diode reduces the transmission band of the band pass filter with increasing incident signal voltage, and the electron discharge tube fires, shorting the strip line conductor which limits transmission of destructively high-powered RF signals.

References Cited by the Examiner
UNITED STATES PATENTS
| | | | |
|---|---|---|---|
| 2,760,163 | 8/1956 | Arditi | 333—13 |
| 3,067,394 | 12/1962 | Zimmerman et al. | 307—88.5 |
| 3,079,571 | 2/1963 | Elliot et al. | 307—88.5 |

FOREIGN PATENTS
| | | |
|---|---|---|
| 877,040 | 9/1961 | Great Britain. |

HERMAN KARL SAALBACH, *Primary Examiner.*

R. F. HUNT, JR., G. TABAK, *Assistant Examiners.*

UNITED STATES PATENT OFFICE
CERTIFICATE OF CORRECTION

Patent No. 3,249,899                                        May 3, 1966

David C. Broderick

It is hereby certified that error appears in the above numbered patent requiring correction and that the said Letters Patent should read as corrected below.

Column 6, line 4, for "118" read -- 124 --; same column 6, lines 6, 10 and 24, for "122", each occurrence, read -- 128 --.

Signed and sealed this 26th day of September 1967.

(SEAL)
Attest:

ERNEST W. SWIDER                                  EDWARD J. BRENNER
Attesting Officer                                         Commissioner of Patents